Patented July 3, 1928.

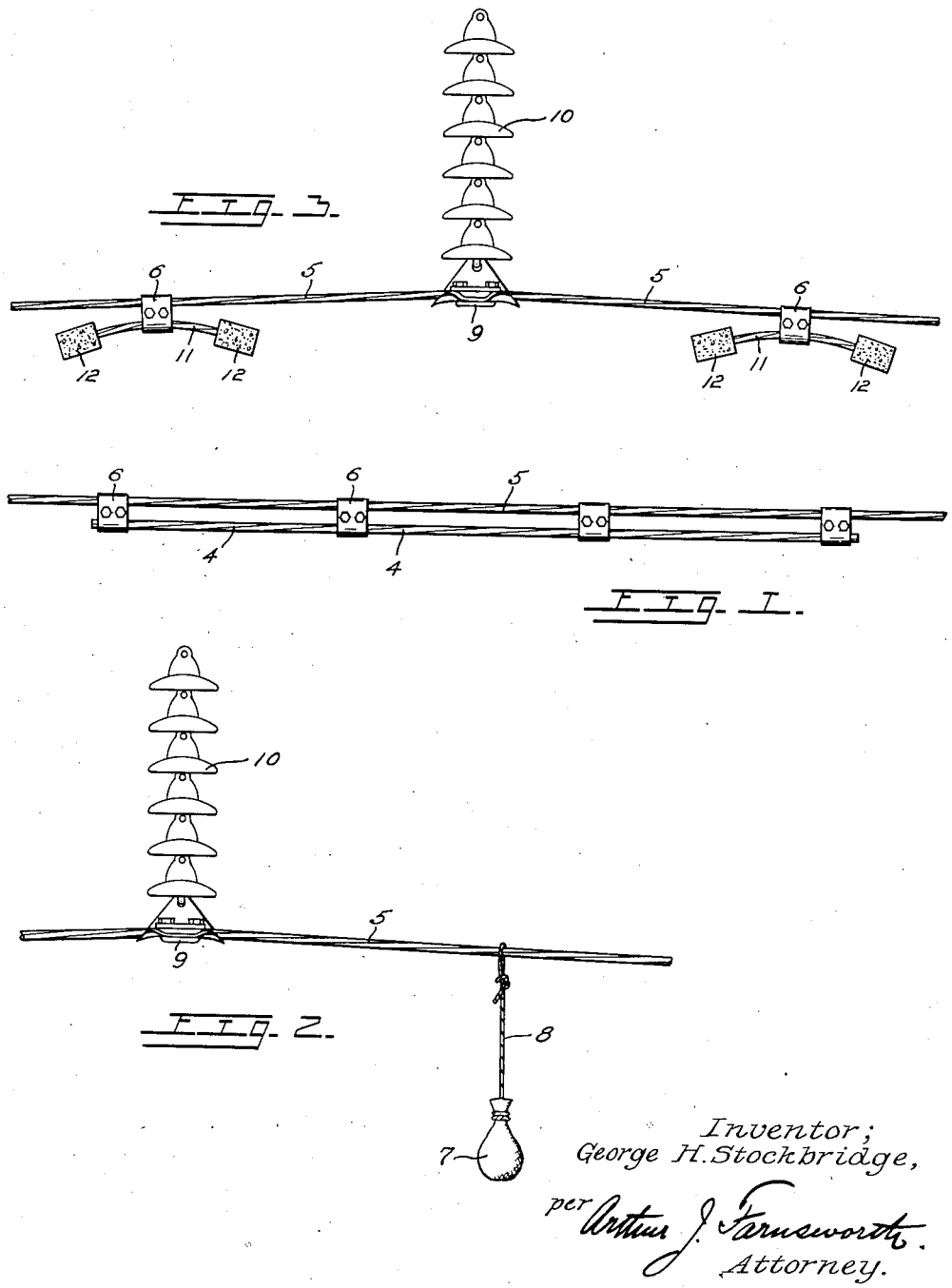

1,675,391

UNITED STATES PATENT OFFICE.

GEORGE H. STOCKBRIDGE, OF LOS ANGELES, CALIFORNIA.

VIBRATION DAMPER.

Application filed November 12, 1925. Serial No. 68,634.

In this specification, and the accompanying drawing, I shall describe and show a preferred form of my invention, and specifically mention certain of its more important objects. I do not limit myself to the forms disclosed, since various changes and adaptations may be made therein without departing from the essence of my invention as hereinafter claimed; and objects and advantages, other than those specifically mentioned, are included within its scope.

My invention relates to means for preventing objectionable vibration in suspended cables, such as are used in electrical transmission lines and the like, and its salient object is to provide a simple, practical, and effective device for this purpose.

The phenomenon of vibration herein considered is to be distinguished from the lateral swinging of cables. The objectionable vibration it is desired to prevent takes place in a vertical or a nearly vertical plane, and produces standing waves in the cable often having an amplitude of an inch or more in long spans and clearly visible from the ground. It has been established that these vibrations are caused by transverse air currents and a breeze of two to three miles per hour is sufficient in some cases to build up long vibration waves with thirty to fifty feet between the nodes. As the velocity of the air currents increases, the amplitude of the vibrations increases until, when the velocity of the air currents has reached seven or eight miles per hour, the vibration of the cable changes to shorter waves having eight to twelve feet between the nodes. In the case of electrical transmission lines increasing trouble from this kind of vibration has been experienced, following the growing tendency to increase the length of the spans and the tension in the cables. The vibration gradually crystallizes the metal of the cables and causes them to fail at the points of support.

Numerous experiments made with a view to eliminating this kind of vibration have indicated that weights rigidly clamped to the cable between the nodal positions are practically useless. A sufficiently heavy weight thus placed will shift the point of reflection of the wave from the suspension clamp to the weight, but will not greatly reduce the vibration. I have discovered however that when properly placed masses are resiliently connected to the cable in the manner to be described, the objectionable vibration may be almost wholly eliminated.

My objects in this invention are attained in the manner illustrated in the accompanying drawings, in which—

Figure 1 is a side elevation of an intermediate portion of a cable span with one form of my vibration damper attached thereto;

Figure 2 is a side elevation of an end portion of a cable span in cooperation with a simple form of vibration damper embodying the principle of my invention; and Figure 3 is a side elevation of the end portions of two adjacent cable spans with an approved form of my vibration damper applied to each.

Similar reference numerals refer to similar parts throughout the several views.

I first discovered that by suspending a parallel short length of resilient cable 4 beneath the main cable 5, in the intermediate portion of a span, as by the double-grooved clamps 6, the vibrations of short wave length could be almost completely eliminated, and the amplitude of the vibrations of long wave length could be greatly reduced. I next discovered that when a piece of pipe or other rigid member was substituted for the resilient cable length 4 the efficiency of the device was greatly reduced. I then found that suitable masses, such as sacks 7 containing metal punchings, if resiliently suspended as by a rope 8 or by resilient hooks, could be made to completely eliminate all vibration in the cable by properly positioning and loading the sacks. Equivalent weights rigidly clamped to the cable at the same points did not produce an appreciable effect so far as reduction of vibration was concerned. On a certain 1000 ft. span I found that a 20 lb. sack resiliently hung from each end of the cable close to the suspension clamps 9 would stop all visible vibration of either long or short wave length, and that the same result could be accomplished by using 10 lb. sacks resiliently hung four feet from the suspension clamps.

The result of these and other experiments directed to the same purpose was to demonstrate that vibration in suspended cables can be completely eliminated, so far as practical results are concerned, if suitable masses are resiliently suspended from the cable at prescribed points. The best positioning of the masses probably depends upon a number of factors including length of the span, tension in the cable, modulus of elasticity of the cable, unit weight of the cable, and wind velocity. For these reasons the best positioning usually has to be determined by trial, but it is to be noted particularly that a very marked and beneficial effect is secured if the positioning of the masses even roughly approximates the true position. It is easy to place the masses very close to their correct position since obviously this should be near the crest of the normal short wave adjacent the suspension clamps.

An approved practical form of my invention is shown in Fig. 3. This figure illustrates an electrical transmission cable 5 suspended by a clamp 9 from a string of suspension insulators 10. On each side of the suspension clamp, and in ordinary cases about 4 feet therefrom, is my improved vibration damper. This comprises a short length of resilient cable 11, ordinarily about 30 inches long, with a mass 12 of concrete at each end. This device is clamped at its center to the main cable 5 by means of double-grooved clamps 6. Obviously other resilient material may be substituted for short cable 11 and for the masses 12.

It is to be noted that each of the several embodiments of my invention illustrated includes one or more masses resiliently suspended from a cable. In the case of Fig. 2 the masses comprise the material in cable 4 between the clamps 6.

These masses may be considered to act through their centers of gravity and therefore they are resiliently connected to cable 5 through the resilient cable 4. In the case of Fig. 2 the mass 7 is resiliently connected to the cable through rope 8. In the case of Fig. 3 the masses 12 are connected to cable 5 through the resilient cables 11.

I desire to call attention to the fact that the use of concrete or similar material for masses 12 offers an advantage in transmission lines over metallic weights, because no charging current is absorbed.

Having thus fully described my invention, I claim:

1. In combination with a cable in a span, a vibration damper comprising; a substantial mass and a member interposed the mass and cable resiliently suspending the former from the latter.

2. In combination with a cable in a span, a vibration damper comprising; a resilient cantilever having a free end and its other end supported by the cable; and a substantial mass at said free end.

3. In combination with a cable in a span, a vibration damper comprising; a resilient bar having free ends, intermediately supported by the cable; and a substantial mass at each of said free ends.

4. In combination with a cable in a span, a vibration damper comprising a substantial mass resiliently suspended from the cable.

5. In combination with an electric conductor in a span, a vibration damper comprising; a substantial non-conducting mass resiliently suspended from the conductor.

6. In combination with an electric conductor in a span, a vibration damper comprising; a resilient bar having free ends, intermediately supported by the conductor; and a substantial non-conducting mass at each of said free ends.

7. In combination with an electric conductor in a span, a vibration damper comprising; a resilient cantilever having a free end and its other end supported by the conductor; and a substantial non-conducting mass at said free end.

GEORGE H. STOCKBRIDGE.